United States Patent

[11] 3,621,034

[72] Inventors Wolfgang Fruhstorfer;
 Istvan Nameny; Wilhelm Baumer; Bernd Dennler, all of Darmstadt, Germany
[21] Appl. No. 879,923
[22] Filed Nov. 25, 1969
[45] Patented Nov. 16, 1971
[73] Assignee E. Merck A.G.
 Darmstadt, Germany
[32] Priority Dec. 7, 1968
[33] Germany
[31] P 18 13 316.9

[54] TETRAOXASPIRO(5,5)UNDECANES AND PROCESS FOR THE PREPARATION THEREOF
 20 Claims, No Drawings
[52] U.S. Cl....................................................... 260/340.7,
 260/45.8, 252/406, 252/407
[51] Int. Cl......................................................... C07d 15/00
[50] Field of Search.......................................... 260/340.7

[56] References Cited
UNITED STATES PATENTS
3,136,785 6/1964 Porret et al.................. 260/340.7
3,161,619 12/1964 Rice et al..................... 260/340.7

Primary Examiner—Alex Mazel
Assistant Examiner—James H. Turnipseed
Attorney—I. William Millen ABSTRACT: Tetraoxaspiro(5,5)undecanes of the formula

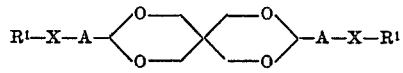

wherein A is alkylene of 1–4 carbon atoms, X is O or S and $R^1$ is alkyl of 2–21 carbon atoms or $-(CH_2)_n-COOR^2$ in which $n$ is 1–3 and $R^2$ is alkyl of up to 18 carbon atoms, which are stabilizers for polyolefins and other polymers, are produced by reacting pentaerythritol with an aldehyde of the formula $R^1-X-A-CHO$ or by reacting the corresponding bis-p,p'-alkenyl substituted or bis-p,p'-hydroxyalkyl substituted tetraoxaspirol(5,5)undecanes with a compound of the formula $R^1-XH$ in which $R^1$, X and A have the values given above.

TETRAOXASPIRO(5,5)UNDECANES AND PROCESS FOR THE PREPARATION THEREOF

BACKGROUND OF THE INVENTION

This invention relates to novel tetraoxaspiro(5,5)undecanes, more particularly to such compounds which are stabilizers for polymers.

The stabilization of polymers, particularly polyolefins, is a well recognized problem. Some compounds are good stabilizers to degradation due to heat and others stabilize against degradation to light.

SUMMARY OF THE INVENTION

According to this invention, polymers are stabilized against degradation due to heat and light by the incorporation therein of an effective amount of a p,p'-bis-alkyl substituted tetraoxaspiro(5,5)undecane as defined herein.

It is an object of this invention to provide novel tetraoxaspiro(5,5)undecanes. Another object is the provision of polymers stabilized against heat by the incorporation therein of the novel tetraoxaspiro(5,5)undecanes of this invention. Still another object is the provision of a process for the stabilization of polymers by the incorporation therein of the tetraoxaspiro(5,5)undecanes of this invention. A further object is the provision of processes for the production of the tetraoxaspiro(5,5)undecanes of this invention. Other objects will be apparent to those skilled in the art to which this invention pertains.

DETAILED DESCRIPTION

The compounds of this invention have the general Formula I

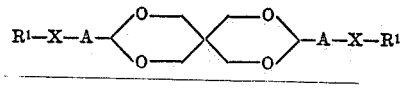

wherein A represents straight-chain or branched alkylene of not more than four carbon atoms, $R^1$ represents alkyl of 2–21 carbon atoms or $-(CH_2)_n-COOR^2$, $R^2$ represents alkyl of up to 18 carbon atoms, $n$ is 1, 2, or 3, and X is O or S.

The compounds of this invention are useful for the stabilization of polymers against oxidative and thermal degradation.

Of the tetraoxaspiro(5,5)undecanes of Formula I, preferred are those having one of the following formulas Ia to Izd wherein —A—X—$R^1$ has the meanings set out below:

| | | |
|---|---|---|
| Ia | $-CHR_3-(CHR_4)_m X-R_1$ | wherein $R_3$ is H or $CH_3$, $R_4$ is H or $CH_3$, and $m$ is 0 to 1; |
| Ib | $-CH_2-(CHR^4)_m X-R^1$ | |
| Ic | $-CH_2-X-R^1$ | |
| Id | $-CH_2CH_2-X-R^1$ | |
| Ie | $-CH_2CH(CH_3)-X-R^1$ | |
| If | $-A-O-R^1$ | |
| Ig | $-CH_2-(CHR^4)_m O-R^1$ | |
| Ih | $-CH_2-O-R^1$ | |
| Ii | $-CH_2CH_2-O-R^1$ | |
| Ij | $-CH_3$ | |
| Ik | $-A-S-R^1$ | |
| Il | $-CH_2-(CHR^4)_m S-R^1$ | |
| Im | $-CH_2-S-R^1$ | |
| In | $-CH_2CH_2-S-R^1$ | |
| Io | $-CH_2CH(CH_3)-S-R^1$ | |
| Ip | $-A-X-R^5$ | wherein $R^5$ is alkyl of 2–21, preferably 8–18 carbon atoms; |
| Iq | $-CH_2CH_2-X-R^5$ | |
| Ir | $-CH_2CH_2-O-R^5$ | |
| Is | $-CH_2CH_2-S-R^5$ | |
| It | $-A-X-R^6$ | wherein $R^6$ is $-(CH_2)_n-COOR^2$, preferably $-CH_2-COOR^2$; |
| Iu | $-CH_2CH(CH_3)-O-R^1$ | |
| Iv | $-CH_2CH_2-O-R^6$ | |
| Iw | $-CH_2CH_2-S-R^6$ | |
| Ix | $-CH_2CH_2-X-CH_2(COO)_m-R^7$ | wherein $R^7$ is alkyl of 7–18 carbon atoms; |
| Iy | $-CH_2CH_2-S-CH_2-COOR^7$ | |
| Iz | $-CH_2CH_2-O-CH_2-COOR^7$ | |
| Iza | $-A-X-R^8$ | wherein $R^8$ is alkyl of 8–18 carbon atoms; |
| Izb | $-CH_2CH_2-X-R^8$ | |
| Izc | $-CH_2CH_2-O-R^8$ | |
| Izd | $-CH_2CH_2-S-R^8$ | |

These preferred compounds fall into the following classes:

a. those in which X and $R^1$ have the values given in Formula I and $A=-CHR^3(CHR^4)_m-$, wherein $R_3$ is H or $CH_3$, $R_4$ is H or $CH_3$ and m is 0 or 1, especially those e.g., $R_3$ is H, e.g., those wherein $R_3$ is H and $m$ is 0, or $m$ is 1 and $R^4$ is H, or $m$ is 1 and $R^4$ is $-CH(CH_3)-$, including each of the above wherein X is O (oxygen) and each of the above wherein X is S (sulfur);

b. Those in which X has the value given in Formula I and $R^1$ is alkyl of 8–18 carbon atoms, and/or A is $-CH_2CH_2-$, including any of the above wherein X is O and the above wherein X is S; and c. those in which A and X have the values given in Formula I and $R^1$ is $-(CH_2)_n-COOR^2$, wherein either $n$ is 1 or $R^2$ is alkyl of 7–18 carbon atoms, especially each of the above wherein $A=-CH_{2}-$, including the latter wherein X is O and the latter wherein X is S.

Tetraoxaspiro(5,5)undecanes of Formula I are prepared by reacting pentaerythritol with an aldehyde of the general formula $R^1-A-CHO$ or by reacting a tetraoxaspiro(5,5)undecane of the general Formula II

wherein $A_1$ represents an alkenyl group of not more than four carbon atoms, corresponding to the residue A, or the group AZ in which Z is an OH-group which optionally can be reactively esterified, with a compound of the general formula $R^1-XH$, $R^1$ in both instances and X having the meanings given above.

In the above-mentioned formulas, $-A-X-R^1$ preferably is $-CHR_{3-4})_m-X-R^1$, wherein $R_3$, $R_4$, and $m$ have the meanings given in Formula Ia, but $R_3$ more preferably is H. For example, A preferably is $-CH_2-$, $-CH_2CH_2-$, $-CH_2-CH(CH_3)-$, or $-CH(CH_3)-CH_2-$. A can also be $-CH(CH_3)-$, $-(CH_2)_3-$, $-(CH_2)_4-$, $-CH(CH_3)CH_2CH_2-$, $-CH_2CH(CH_3)CH_2-$, $-CH_2CH_2CH(CH_3)-$, $-CH(C_2H_5)-CH_2-$, $-CH_2-CH(C_2H_5)$ $-C(CH_3)_2-CH_2-$, $-CH_2-C(CH_3)_2-$, $-CH(n-C_3H_7)-$, or $-CH(iso-C_3H_7)-$.

The alkyl groups $R^1$ and $R^2$ preferably are ethyl, n-propyl isopropyl, n-butyl, isobutyl, n-pentyl, isopentyl, n-hexyl, isohexyl, n-heptyl, isoheptyl, n-octyl isooctyl (2-ethyl-hexyl), n-nonyl, n-decyl, n-undecyl, n-dodecyl, isododecyl, n-tridecyl, n-tetradecyl, n-pentadecyl, isopentadecyl, n-hexadecyl (palmityl), isohexadecyl, n-heptadecyl, n-octadecyl (stearyl), or isooctadecyl. $R^2$ also can be methyl; $n$ and $m$ are each preferably 1. Preferred alkenyl groups in the residue $A_1$ are: vinyl and propen-1-yl. Others are allyl, propen-2-yl, and 2-buten-2-yl. Z preferably is Cl or Br but it can also represent I, an alkane or arylsulfonyloxy group, e.g., methanesulfonyloxy, benzenesulfonyloxy, p-toluene-sulfonyloxy, or other reactive ester groups, as well as free OH.

The starting materials of Formula II can be obtained by reacting pentaerythritol with aldehydes of the formula $A_1-CHO$, e.g., acrolein, crotonaldehyde, methacrolein, chloroacetaldehyde, bromoacetaldehyde.

The reaction of pentaerythritol with an aldehyde of the formula $R^1-X-A-CHO$ is normally conducted in the presence of an inert solvent, e.g., benzene, toluene, or xylene, and in the presence of a strongly acidic catalyst, e.g., p-toluenesulfonic acid or sulfuric acid, or an acidic ion exchanger, in accordance with conventional acetalizing methods. It is advantageous to remove the water formed during the reaction A—from the reaction mixture, for example, with the aid of a water trap. The reaction takes place at temperatures of between 0° and 150°, preferably at the boiling temperature of the solvent employed. The aldehydes used in this reaction are known. They can be obtained by the chemical addition of alcohols or mercaptans of the formula $R^1$–XH to aldehydes of the formula $A_1$–CHO, e.g., acrolein, crotonaldehyde, or methacrolein, with base catalysts. Preferred aldehydes are those wherein the residue $R^1$–X–A– has the meanings given for compounds of Formulas I$a$ through I$zd$.

The reaction of spiranes of Formula II with alcohols or mercaptans of the formula $R^1$–XH is also preferably conducted in the presence of an inert solvent, such as benzene, toluene, xylene, in the presence of a basic catalyst, such as pyridine, triethylamine, sodium or potassium hydroxide, or sodium or potassium carbonate, especially at temperatures of between 0° and 150° C., preferably at the boiling temperature of the solvent employed. Examples of spiranes of Formula II are 3,9-bis-(chloromethyl)-, 3,9-bis-(bromomethyl)-, 3,9-divinyl-, 3,9-bis-(2-chloroethyl)-, 3,9-bis-(2-bromoethyl)-, 3,9-bis-(2-iodoethyl)-, 3,9-bis-(2-p-toluenesulfonyloxyethyl)-, 3,9-bis-(2-methanesulfonyloxyethyl)-, 3,9-bis-(2-benzenesulfonyloxyethyl)-, 3,9-bis-(1-bromoethyl)-3,9-bis-(1-chloroethyl)-, 3,9-bis-(propen-1-yl)-, 3,9-bis-(2-bromopropyl)-, 3,9-bis-(2-chloropropyl)-, 3,9-bis-(3-bromopropyl)-, 3,9-bis-(3-chloropropyl)-, 3,9-bis-(propen-2-yl)-, 3,9-bis-(1-bromo-2-propyl)-, 3,9-bis-(2-buten-2-yl)-, and 3,9-bis-(3-bromo-2-butyl)-2,4,8,10-tetraoxaspiro(5,5)undecane. Alcohols and mercaptans of the formula $R^1$–XH include ethanol, n-propanol, isopropanol, n-butanol, isobutanol, n-amyl alcohol, isoamyl alcohol, n-hexanol, isohexanol, n-heptanol, isoheptanol, n-octanol, isooctanol, n-nonanol, n-decanol, n-undecanol, n-dodecanol, isododecanol, n-tridecanol, n-tetradecanol, n-pentadecanol, isopentadecanol, n-hexadecanol, isohexadecanol, n-heptadecanol, n-octadecanol, isooctadecanol, eicosanol, and heneicosanol, and the corresponding thiols. It is also possible to employ technical grade mixtures of alcohols or mercaptans of various chain lengths, for example a technical mixture of alcohols having chain lengths from $C_{12}$ to $C_{15}$.

This invention relates to the use of compounds of the general formula I for the stabilization of polymers, preferably polyolefins, particularly polyethylene or polypropylene, optionally in combination with conventional stabilizers.

The incorporation of the compounds of this invention into the polymers to be stabilized does not present any special technical problems and is done in accordance with conventional methods, preferably by mechanical mixing of the powdered components. However, it is also possible to add the stabilizer of this invention to the monomers prior to polymerization, thus obtaining a stabilized product by the polymerizing process.

It is furthermore possible, in accordance with the invention, to apply the novel stabilizers in combination with conventional stabilizers. Especially suitable are phenols alkylated in the aromatic nucleus (e.g., 2,6-di-tert.-butyl-4-methylphenol), fatty acid esters or dicarboxylic acid esters, respectively, containing thioether groups or mercapto groups, e.g., esters of $\beta,\beta'$-thiodipropionic acid or of thioglycolic acid, and aromatic amines, e.g., N,N'-diphenyl-p-phenylenediamine.

In addition to, or in place of, the conventional stabilizers, it is also possible to add to the polymer further additives, for example, technical light-protective agents (UV-absorbents). Suitable light-protective agents are, for example, o-hydroxybenzophenones, benzotriazole derivatives, salicylic acid derivatives, substituted cinnamic acid nitriles.

The compounds of Formula I are employed in accordance with this invention as stabilizers, generally in amounts of 0.05–3 percent by weight, preferably 0.1–1 percent, and usually about 0.05 percent by weight, calculated on the dry polymer. If conventional stabilizers are also employed, the total stabilizer content is usually 0.1–5 percent by weight, preferably 0.1–1 percent, and usually about 0.5 percent by weight, based on the dry polymer. When using additional light-protective agents, it is desirable to incorporate in the polymer from 0.1–0.5 percent by weight of the tetraoxaspiroundecane and 0.2–0.7 percent by weight of the light-protective agent.

Polymers which can be stabilized by the compounds of this invention include polyolefins, both high-pressure and low-pressure, especially polyethylene and polypropylene, and polybutylene, polyisobutylene, polystyrene; copolymers thereof, e.g., copolymers of styrene and ethylene, propylene, butylene, isobutylene or butadiene; copolymers of ethylene and propylene; copolymers of ethylene and vinyl esters, e.g., vinyl acetate; copolymers of ethylene and acrylic acid, salts thereof or esters thereof, e.g., ethyl acrylate; chlorinated polyethylene; sulfochlorinated polyethylene; and polyvinyl chloride.

Among the polymers which are stabilized with the compounds of this invention, are polyethylenes and polypropylenes having molecular weights between 3,000 and 10,000,000, preferably between 5,000 and 5,000,000. The polyethylenes exhibit densities of between about 0.92 and 0.98 and melt indices $MFI_5$ of between about 0.001 and 40, preferably between 0.01 and 30, especially between 0.1 and 25 g. ×10 min.$^{-1}$; the polypropylenes exhibit densities of between about 0.90 and 0.92, and melt indices $MFI_5$ of between about 0.1 and 25 g. ×10 min.$^{-1}$.

The stabilizing effect of the compounds of this invention can be determined by measuring the elongation-at-rupture [German Industrial Standard 43,455] of polyethylene test bodies stabilized with a compound of Formula I, in the manner described below.

Unstabilized, powdered low-pressure polyethylene ] density 0.94–0.96; melt index $MFI_5$ (ASTM 1238-57T, 5 kg. load) 1.3–1.8 g.×10 min.$^{-1}$] was intimately mixed with 0.5 percent by weight of a compound of this invention. The mixture was thereafter kneaded in a mixing roll mill for 1 hour at 145° C. The rolled polymer was molded into sheets of 2 mm. thickness with a hydraulic press at 145°–150° C. and a pressure of about 100 kp./cm.$^2$. From these sheets, test bodies of 10×50 mm. were cut, and the elongation at rupture was measured on these bodies by means of the tensile strength testing machine. Other test bodies were illuminated in the xenon test apparatus to determine their internal discoloration due to light.

In this manner, stabilized polyethylenes were obtained using the compounds of this invention as stabilizers. The following values for the elongation at rupture (D) were obtained in the above-described test for polyethylenes stabilized with the compounds set out below:

| Stabilizer | Elongation at Rupture (D) |
|---|---|
| 3,9-bis-(2-isooctyloxyethyl)-2,4,8,10-tetraoxaspiro (5,5)undecane | 9.4 |
| 3,9-bis-(2-n-dodecyloxycarbonylmethylthioethyl)-2,4,8,10-tetraoxaspiro(5,5)undecane | 8.4 |
| 3,9-bis-(2-n-dodecylthioethyl)-2,4,8,10-tetraoxaspiro(5,5)undecane | 7.88 |
| 3,9-bis-(2-isooctyloxycarbonylmethylthioethyl)-2,4,8,10-tetraoxaspiro(5,5)undecane | 7.8 |
| 3,9-bis-(2-n-octadecyloxycarbonylmethylthio-ethyl)-2,4,8,10-tetraoxaspiro(5,5)undecane | 7.2 |

Unstabilized polyethylene, under the same conditions, exhibited practically no elongation at all (D=0). None of the above samples showed a discoloration due to light.

In the following examples, the preparation of several typical compounds of this invention is described. Some products are crystalline, others are nondistillable oils which were characterized by determining the molecular weight (MW) thereof by mass spectroscopy.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the following examples, all degrees given are in degrees Centigrade.

Preparation: 3,9-Bis-(bromoethyl)-2,4,8,10-tetraoxaspiro-(5,5)undecane 42.3 g. of 3,9-divinyl-2,4,8,10-tetraoxaspiro(5,5)undecane and 5 g. of anhydrous aluminum tribromide are dissolved in 200 ml. of chloroform. At a temperature of 5° C., a stream of gaseous hydrogen bromide is introduced into the solution for 20 minutes. The solution is poured on ice water and extracted with chloroform. The chloroform phase is washed neutral and evaporated, the remaining 3,9-Bis-(bromoethyl)-2,4,8,10tetraoxaspiro()undecane is recrystallized from petroleum ether. M.p. 84°-85°.

EXAMPLE A 51.6 g. of 3-dodecylthiopropanal ($\beta$-dodecylthiopropion-aldehyde) and 13.6 g. of pentaerythritol are boiled in 170 ml. of benzene with 0.5 g. of p-toluenesulfonic acid on a water trap. After 3½ hours, 4 ml. of water has been separated. The benzene is distilled off, and the thus-obtained 3,9-bis-(2-n-dodecylthioethyl)-2,4,8,10-tetraoxaspiro(5,5)undecane is recrystallized from ethanol, m.p. 35°

In an analogous manner, the following compounds are obtained by the reaction of pentaerythritol with:
3-ethoxypropanal:
3,9-Bis-(2-ethoxyethyl)-2,4,8,10-tetraoxaspiro(5,5)-undecane, oil, MW 304;
3-n-Butoxypropanal:
3,9-Bis-(2-n-butoxyethyl)-2,4,8,10-tetraoxaspiro(5,5)-undecane, oil, MW 360;
3-Isooctyloxypropanal:
3,9-Bis-(2-isooctyloxyethyl)-2,4,8,10-tetraoxaspiro(5,5)-undecane, oil, MW 472;
3-ethylthiopropanal:
3,9-Bis-(2-ethylthioethyl)-2,4,8,10-tetraoxaspiro(5,5)-undecane, oil, MW 337;
3-n-Butylthiopropanal:
3,9-Bis-(2-n-butylthioethyl)-2,4,8,10-tetraoxaspiro(5,5)-undecane, oil, MW 393;
3-n-Octylthiopropanal:
3,9-Bis-(2-n-octylthioethyl)-2,4,8,10-tetraoxaspiro(5,5)-undecane, m.p. 30°-32°;
3-n-Hexadecylthiopropanal:
3,9-Bis-(2-hexadecylthioethyl)-2,4,8,10-tetraoxaspiro(5,5)undecane, m.p. 74° (from ethanol);
the methyl ester of S-(3-oxopropyl)-thioglycolic acid:
3,9-Bis-(2-methoxycarbonylmethylthioethyl)-2,4,8,10-tetraoxaspiro(5,5)undecane, oil, MW 424;
the isobutyl ester of S-(3-oxopropyl)-thioglycolic acid: 3,9-bis-(2-isobutoxycarbonylmethylthioethyl)-2,4,8,10-tetraoxaspiro(5,5)undecane, oil, MW 508;
the isooctyl ester of S-(3-oxopropyl)-thiogycolic acid: 3,9-bis-(2-isooctyloxycarbonylmethylthioethyl)-2,4,8,10-tetraoxaspiro(5,5)undecane, b.p. 170°/0.01 mm.;
the methyl ester of $\beta$-(3-oxopropylthio)-propionic acid:
3,9-bis-[2-(2-methoxycarbonylethylthio)-ethyl]-2,4,8,10-tetraoxaspiro(5,5) undecane, oil, MW 452;
the isobutyl ester of $\beta$-(3-oxopropylthio)-propionic acid:
3,9-bis-[2-(2-isobutoxycarbonylethylthio)-ethyl]-2,4,8,10-tetraoxaspiro(5,5)undecane, oil, MW 536;
the isooctyl ester of $\beta$-(3-oxopropylthio)-propionic acid:3,9-bis-[2-(2-isooctyloxycarbonylethylthio)-ethyl]-2,4,8,10-tetraoxaspiro(5,5) undecane, oil, MW 648;
the n-dodecyl ester of $\beta$-(3-oxopropylthio)-propionic acid:
3,9-bis-[2-(2-n-dodecyloxycarbonylethylthio)-ethyl]-2,4,8,10-tetraoxaspiro(5,5)undecane, m.p. 45°;
the n-octadecyl ester of $\beta$-(3-oxopropylthio)-propionic acid:
3,9-bis-[2-(2-n-octadecyloxycarbonylethylthio)-ethyl]-2,4,8,10-tetraoxaspiro(5,5)undecane, m.p. 62°-64°;
the methyl ester of $\gamma$-(3-oxopropylthio)-butyric acid:
3,9-bis-[2-(3-methoxycarbonylpropylthio)-ethyl]-2,4,8,10-tetraoxaspiro(5,5)undecane, oil, MW 480;
the n-octadecyl ester of $\gamma$-(3-oxopropylthio)-butyric acid:
3,9-bis-[2-(3-n-octadecyloxycarbonylpropylthio)-ethyl]-2,4,8,10-tetraoxaspiro(5,5)undecane, m.p. 68°-70°

EXAMPLE B

Twenty-one g. of 3,9-divinyl-2,4,8,10-tetraoxaspiro(5,5)undecane (obtainable from pentaerythritol and acrolein) and 52 g. of the n-dodecyl ester of thioglycolic acid are boiled in 500 ml. of benzene with 5 ml. of pyridine for 3 hours. After 2 hours, another 2 ml. of pyridine is added. The solvent is distilled off, the residue is mixed with 150 ml. of ethanol and allowed to stand overnight. The thus-obtained 3,9-bis-(2-n-dodecyloxycarbonylmethylthioethyl)-2,4,8,10-tetraoxaspiro(5,5)undecane is vacuum-filtered and recrystallized from ethanol; m.p. 43°.

Similarly, the following compounds are obtained by the reaction of 3,9-divinyl-2,4,8,10-tetraoxaspiro(5,5)undecane with:
Ethyl mercaptan:
3,9-Bis-(2-ethylthioethyl)-2,4,8,10-tetraoxaspiro(5,5)undecane, oil, MW 337;
n-Butyl mercaptan:
3,9-Bis-(2-n-butylthioethyl)-2,4,8,10-tetraoxaspiro(5,5)undecane, oil, MW 393;
n-Octyl mercaptan:
3,9-Bis-(2-n-octylthioethyl)-2,4,8,10-tetraoxaspiro(5,5)undecane, m.p. 30°-32°;
n-Dodecyl mercaptan:
3,9-Bis-(2-n-dodecylthioethyl)-2,4,8,10-tetraoxaspiro(5,5)undecane, m.p. 35°;
n-Hexadecyl mercaptan:
3,9-Bis-(2-hexadecylthioethyl)-2,4,8,10-tetraoxaspiro(5,5)undecane, m.p. 74°;
the octadecyl ester of thioglycolic acid:
3,9-bis-(2-n-octadecyloxycarbonylmethylthioethyl)-2,4,8,10-tetraoxaspiro(5,5)undecane, m.p. 63°-64°.

In an analogous manner, the following compounds are produced by the reaction of 3,9-dipropenyl-2,4,8,10-tetraoxaspiro(5,5)undecane (obtainable from pentaerythritol and crotonaldehyde) with:
n-Butyl mercaptan:
3,9-Bis-(2-n-butylthio-1-propyl)-2,4,8,10-tetraoxaspiro(5,5)undecane, m.p. 66°-68°;
n-Octyl mercaptan:
3,9-Bis-92-n-octylthio-1-propyl)-2,4,8,10-tetraoxaspiro(5,5)undecane, m.p. 73°-75°;
n-Dodecyl mercaptan:
3,9-Bis-(2-n-dodecylthio-1-propyl)-2,4,8,10-tetraoxaspiro(5,5)undecane, m.p. 78°;
n-Hexadecyl mercaptan:
3,9-Bis-(2-n-hexadecylthio-1-propyl)2,4,8,10-tetraoxaspiro(5,5)undecane, m.p. 58°-60°
n-Octadecyl mercaptan:
3,9-Bis-(2-n-octadecylthio-1-propyl)-2,4,8,10-tetraoxaspiro(5,5)undecane, m.p. 62°-64°;
the n-dodecyl ester of thioglycolic acid:
3,9-bis-(2-n-dodecyloxycarbonylmethylthio-1-propyl)-2,4,8,10-tetraoxaspiro(5,5)undecane, oil, MW 760;
the n-dodecyl ester of $\beta$-mercaptopropionic acid:
3,9-bis-[2-(2-n-dodecyloxycarbonylethylthio)-1-propyl]-2,4,8,10-tetraoxaspiro(5,5)undecane, m.p. 56°-58°.

Analogously, by reaction with the corresponding mercaptans, the following compounds are obtained by the reaction of 3,9-bis-(propen-2-yl)-2,4,8,10-tetraoxaspiro(5,5)undecane (obtainable from pentaerythritol and methacrolein) with:
Ethyl mercaptan:
3,9-Bis-(1-ethylthio-2-propyl)-2,4,8,10-tetraoxaspiro(5,5)undecane;
n-Butyl mercaptan:
3,9-Bis-(1-n-butylthio-2-propyl)-2,4,8,10-tetraoxaspiro(5,5)undecane;
n-Octyl mercaptan:
3,9-Bis-(1-n-octylthio-2-propyl)-2,4,8,10-tetraoxaspiro(5,5)undecane;

Isooctyl mercaptan:
3,9-Bis-(1-isooctylthio-2-propyl)-2,4,8,10-tetraoxaspiro(5,5)undecane;
n-Dodecyl mercaptan:
3,9-Bis-(1-n-dodecylthio-2-propyl)-2,4,8,10-tetraoxaspiro(5,5)undecane;
n-Hexadecyl mercaptan:
3,9-Bis-(1-n-hexadecylthio-2-propyl)-2,4,8,10-tetraoxaspiro(5,5)undecane;
n-Octadecyl mercaptan:
3,9-Bis-(1-n-octadecylthio-2-propyl)-2,4,8,10-tetraoxaspiro(5,5)undecane;
Isooctyloxycarbonylmethyl mercaptan:
3,9-Bis-(1-isooctyloxycarbonylmethylthio-2-propyl)-2,4,8,10-tetraoxaspiro(5,5)undecane;
n-Dodecyloxycarbonylmethyl mercaptan:
3,9-Bis-(1-n-dodecyloxycarbonylmethylthio-2-propyl)-2,4,8,10-tetraoxaspiro(5,5)undecane;
n-Octadecyloxycarbonylmethyl mercaptan:
3,9-Bis-(1-n-octadecyloxycarbonylmethylthio-2-propyl)-2,4,8,10-tetraoxaspiro(5,5)undecane.

EXAMPLE C 25.7 g. of 3,9-bis-(chloromethyl)-2,4,8,10-tetraoxaspiro(5,5)undecane (obtainable from pentaerythritol and chloroacetaldehyde) and 40.4 g. of n-dodecyl mercaptan is boiled under agitation in 500 ml. of acetone in the presence of 14 g. of potassium carbonate for 24 hours. The reaction mixture is filtered, evaporated, and the thus-obtained 3,9-bis-(n-dodecylthiomethyl)-2,4,8,10-tetraoxaspiro(5,5)undecane is recrystallized from methanol; m.p. 50°–52°.

In place of acetone, it is also possible to employ ethanol, isopropanol or tetrahydrofuran.

Analogously, the following compounds are obtained by the reaction of 3,9-bis-(chloromethyl)-2,4,8,10-tetraoxaspiro(5,5)undecane with:

n-hexadecyl mercaptan:
3,9-bis-(n-hexadecylthiomethyl)-2,4,8,10-tetraoxaspiro(5,5)undecane, m.p. 46°–49°;
n-octadecyl mercaptan:
3,9-bis-(n-octadecylthiomethyl)-2,4,8,10-tetraoxaspiro(5,5)undecane, m.p. 30°–35°; the n-dodecyl ester of thioglycolic acid:
3,9-bis-(n-dodecyloxycarbonylmethylthiomethyl)-2,4,8,10-tetraoxaspiro(5,5)undecane, oil, MW 724;
the n-dodecyl ester of β-mercaptopropionic acid:
3,9-bis-[2-(n-dodecyloxycarbonyl)-ethylthiomethyl]-2,4,8,10-tetraoxaspiro(5,5)undecane, m.p. 38°–

Analogously, the following compounds can be produced by the reaction of 3,9-bis-(2-bromoethyl)-2,4,8,10-tetraoxaspiro(5,5)undecane (obtainable by HBr addition to 3,9-divinyl-2,4,8,10-tetraoxaspiro(5,5)undecane) with:

the n-butyl ester of glycolic acid:
3,9-bis-[2-(n-butoxycarbonylmethoxy)-ehtyl]-2,4,8,10-tetraoxaspiro(5,5)undecane, oil, MW 452;
a commercial mixture of various alcohols having chain lengths of between $C_{12}$ and $C_{15}$:
an oily mixture of 3,9-bis-(2-alkoxyethoxy)-2,4,8,10-tetraoxaspiro(5,5)undecanes (wherein the alkoxy group contains 12–15 carbon atoms).

In addition to the compounds set forth in the above examples, the following 2,4,8,10-tetraoxaspiro(5,5)undecanes are, for example, especially suitable according to the invention for the stabilization of polymers:

3,9-Bis-(2-n-propylthioethyl)-, 3,9-Bis-(2-n-pentylthioethyl)-, 3,9-Bis-(2-n-hexylthioethyl)-, 3,9-Bis-(2-n-heptylthioethyl)-, 3,9-Bis-(2-n-isooctylthioethyl)-, 3,9-Bis-(2-n-nonylthioethyl)-, 3,9-Bis-(2-n-decylthioethyl)-, 3,9-Bis-(2-n-undecylthioethyl)-, 3,9-Bis-(2-n-tridecylthioethyl)-, 3,9-Bis-(2-tetradecylthioethyl)-, 3,9-Bis-(2-n-pentadecylthioethyl)-, 3,9-Bis-(2-n-heptadecylthioethyl)-, 3,9-Bis-(2-n-octadecylthioethyl)-, 3,9-Bis-(2-ethoxycarbonylmethylthioethyl)-, 3,9-Bis-(2-n-propoxycarbonylmethylthioethyl)-, 3,9-Bis-(2-isopropoxycarbonylmethylthioethyl)-, 3,9-Bis-(2-n-butoxycarbonylmethylthioethyl)-, 3,9-Bis-(2-n-pentyloxycarbonylmethylthioethyl)-, 3,9-Bis-(2-isopentyloxycarbonylmethylthioethyl)-, 3,9-Bis-(2-hexyloxycarbonylmethylthioethyl)-, 3,9-Bis-(2-isohexyloxycarbonylmethylthioethyl)-, 3,9-Bis-(2-n-heptyloxycarbonylmethylthioethyl)-, 3,9-Bis-(2-n-octyloxycarbonylmethylthioethyl)-, 3,9-Bis-(2-n-nonyloxycarbonylmethylthioethyl)-, 3,9-Bis-(2-n-decyloxycarbonylmethylthioethyl)-, 3,9-Bis-(2-n-undecyloxycarbonylmethylthioethyl)-, 3,9-Bis-(2-n-tridecyloxycarbonylmethylthioethyl)-, 3,9-Bis-(2-n-tetradecyloxycarbonylmethylthioethyl)-, 3,9-Bis-(2-n-pentadecyloxycarbonylmethylthioethyl)-, 3,9-Bis-(2-n-hexadecyloxycarbonylmethylthioethyl)-, 3,9-Bis-(2-n-heptadecyloxycarbonylmethylthioethyl)-, 3,9-Bis-(2-n-propoxyethyl)-, 3,9-Bis-(2-isopropoxyethyl)-, 3,9-Bis-(2-isobutoxyethyl)-, 3,9-Bis-(2-n-pentyloxyethyl)-, 3,9-Bis-(2-isopentyloxyethyl)-, 3,9-Bis-(2-n-hexyloxyethyl)-, 3,9-Bis-(2-isohexyloxyethyl)-, 3,9-Bis-(2-n-heptyloxyethyl)-, 3,9-Bis-(2-n-octyloxyethyl)-, 3,9-Bis-(2-n-nonyloxyethyl)-, 3,9-Bis-(2-n-decyloxyethyl)-, 3,9-Bis-(2-n-undecyloxyethyl)-, 3,9-Bis-(2-n-dodecyloxyethyl)-, 3,9-Bis-(2-n-tridecyloxyethyl)-, 3,9-Bis-(2-n-tetradecyloxyethyl)-, 3,-Bis-(2-n-pentadecyloxyethyl)-, 3,9-Bis-(2-n-hexadecyloxyethyl)-, 3,9-Bis-(2-n-heptadecyloxyethyl)-, and 3,9-Bis-(2-n-octadecyloxyethyl)-2,4,8,10-tetraoxaspiro(5,5)undecane.

The formulation examples set forth below are formulas for polymers stabilized in accordance with the invention. The numerical values are percent by weight. As the "polyethylene" a low-pressure low-pressure polyethylene (density 0.94–0.96; $MFI_5$ 1.3–1.8) is employed, unless indicated otherwise.

EXAMPLE 1

| | |
|---|---|
| Polyethylene | 99.7 |
| 3,9-Bis-(2-isooctyloxethyl)-2,4,8,10-16 tetraoxaspiro(5,5)undecane | 0.3 |

EXAMPLE 2

| | |
|---|---|
| Polyethylene | 99.5 |
| 3,9-Bis-(2-n-dodecylthioethyl)-2,4,8,10-tetraoxaspiro(5,5)undecane | 0.5 |

EXAMPLE 3

| | |
|---|---|
| Polyethylene | 99.3 |
| 3,9-Bis-(2-n-dodecyloxycarbonylmethylthioethyl)-2,4,8,10-tetraoxaspiro(5,5)undecane | 0.7 |

EXAMPLE 4

| | |
|---|---|
| Polyethylene | |
| 3,9-Bis-(2-n-octadecyloxycarbonylmethylthioethyl)-2,4,8,10-tetraoxaspiro(5,5)undecane | 0.5 |

EXAMPLE 5

| | |
|---|---|
| Polyethylene | 99.5 |
| 3,9-Bis-(2-isooctyloxycarbonylmethylthioethyl)-2,4,8,10-tetraoxaspiro(5,5)undecane | 0.5 |

EXAMPLE 6

| | |
|---|---|
| Polyethylene | 99.5 |
| 3,9-Bis-(2-n-octadecyloxycarbonylmethylthioethyl)-2,4,8,10-tetraoxaspiro(5,5un- | |

EXAMPLE 7

| | |
|---|---|
| Polyethylene | 99.5 |
| 3,9-Bis-(n-dodecylthiomethyl)-2,4,8,10-tetraoxaspiro(5,5)undecane | 0.4 |
| 2,2-Dihydroxy-3,3-di-tert.-butyl-5,5-dimethyldiphenylmethane | 0.1 |

EXAMPLE 8

| | |
|---|---|
| Polyethylene | 99.5 |
| 3,9-Bis-(2-n-dodecylthioethyl)-2,4,8,10-tetraoxaspiro(5,5)undecane | 0.25 |
| 2,2-Bis-(4-hydroxyphenyl)-propane | 0.25 |

EXAMPLE 9

| | |
|---|---|
| Polyethylene | 99.6 |
| 3,9-Bis-(2-n-dodecyloxycarbonylmethylthioethyl)-2,4,8,10-tetraoxaspiro(5,5)undecane | 0.2 |
| 1,3,5-Trimethyl-2,4,6-tris-(3,5-di-tert.-butyl-4-hydroxybenzyl)-benzene | 0.2 |

EXAMPLE 10

| | |
|---|---|
| Polyethylene | 99.3 |
| 3,9-Bis-(2-n-butylthio-1-propyl)-2,4,8,10-tetraoxaspiro(5,5)undecane | 0.3 |
| 3-(3,5-Di-tert.-butyl-4-hydroxyphenyl)-propionic acid pentaerythritol monoester | 0.4 |

EXAMPLE 11

| | |
|---|---|
| Polyethylene | 99.4 |
| 3,9-Bis-(2-n-dodecyloxycarbonylmethyl-thio-1-propyl)-2,4,8,10-tetraoxaspiro-(5,5)undecane | 0.3 |
| 3-(3,5-Di-tert.-butyl-4-hydroxyphenyl)-propionic acid stearyl ester | 0.3 |

EXAMPLE 12

| | |
|---|---|
| Polyethylene | 99.5 |
| 3,9-Bis-(2-isooctyloxyethyl)-2,4,8,10-tetraoxaspiro(5,5)undecane | 0.2 |
| $\beta,\beta'$-Thiodipropionic acid dilauryl ester | 0.3 |

EXAMPLE 13

| | |
|---|---|
| Polyethylene (D=0.930–0.932; MFI$_2$ 17–22) | 99.5 |
| 3,9-Bis-(2-isobutoxycarbonylmethoxyethyl)-2,4,8,10-tetraoxaspiro(5,5)undecane | 0.2 |
| $\beta\beta'$-Thiodipropionic acid distearyl ester | 0.3 |

EXAMPLE 14

| | |
|---|---|
| Polyethylene (D=0.918–0.920; MFI$_2$ 1.2–1.7) | 99.5 |
| 3,9-Bis-(2-isooctyloxyethyl)-2,4,8,10-tetraoxaspiro(5,5)undecane | 0.25 |
| 2,6-Di-tert.-butyl-4-methylphenol | 0.25 |

EXAMPLE 15

| | |
|---|---|
| Polyvinyl chloride | 99.5 |
| 3,9-Bis-(n-octyloxymethyl)-2,4,8,10-tetraoxaspiro(5,5)undecane | 0.3 |
| N,N'-Diphenyl-p-phenylenediamine | 0.2 |

EXAMPLE 16

| | |
|---|---|
| Polyvinyl chloride | 99.5 |
| 3,9-Bis-(2-n-butylthio-1-propyl)-2,4,8,10-tetraoxaspiro(5,5)undecane | 0.3 |
| N,N'-Diphenyl-p-phenylenediamine | 0.2 |

EXAMPLE 17

| | |
|---|---|
| Polyethylene | 99.2 |
| 3,9-Bis-(2-n-dodecyloxycarbonylmethylthioethyl)-2,4,8,10-tetraoxaspiro(5,5)undecane | 0.3 |
| 2-Hydroxybenzoic acid -p-tert.-butylphenyl | 0.5 |

EXAMPLE 18

| | |
|---|---|
| Polyethylene | 99.0 |
| 3,9-Bis-(2-n-dodecylthioethyl)-2,4,8,10-tetraoxaspiro(5,5)undecane | 0.4 |
| 2-Hydroxybenzoic acid-p-octylphenyl ester | 0.6 |

EXAMPLE 19

| | |
|---|---|
| Polyethylene | 99.2 |
| 3,9-Bis-(2-isooctyloxethyl)-2,4,8,10-tetraoxaspiro(5,5)undecane | 0.2 |
| 2-Hydroxy-4-dodecylbenzophenone | 0.6 |

EXAMPLE 20

| | |
|---|---|
| Polyethylene | 99.2 |
| 3,9-Bis-(2-isobutoxycarbonylmethoxyethyl)-2,4,8,10-tetraoxaspiro(5,5)undecane | 0.4 |
| 2,2'-Dihydroxy-4-octyloxybenzophenone | 0.4 |

EXAMPLE 21

| | |
|---|---|
| Polyethylene | 99.3 |
| 3,9-Bis-(2-n-dodecylthio-1-propyl)-2,4,8,10-tetraoxaspiro(5,5)undecane | 0.3 |
| 5-Chloro-2-(2-hydroxy-3-tert.-butyl-5-methyl-phenyl)-benzotriazole | 0.4 |

Example 22

| | |
|---|---|
| Polyethylene (D=0.96; MFI$_5$ 19–23) | 99.5 |
| 3,9-Bis-(isooctyloxymethyl)-2,4,8,10-tetraoxaspiro(5,5)undecane | 0.2 |
| Trisubstituted acrylonitrile ("Uvinal N 35") | 0.3 |

In the above formulation examples, it is possible to employ, in place of the aforementioned polymers, other low-pressure and high-pressure polyethylenes and polypropylenes and the other polymers set forth above.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A tetraoxaspiro (5,5) undecane of the formula

wherein A is alkylene of one to four carbon atoms; $R^1$ is a member of the group consisting of alkyl of two to 21 carbon atoms and a group of the formula $-(CH_2)_n-COOR^2$ wherein $R^2$ is alkyl of one to 18 carbon atoms; $n$ is an integer from 1 to 3; and X is a member of the group consisting of O and S.

2. A compound of claim 1 wherein A is an alkylene group of the formula $-CHR^3-(CHR_4)_m-$ in which $R^3$ is H or $CH_3$, $R^4$ is H or $CH_3$ and $m$ is the integer 0 or 1.

3. A compound of claim 2 wherein $R^3$ is H.

4. A compound of claim 3 wherein $m$ is O.

5. A compound of claim 3 wherein $m$ is 1 and $R^4$ is H.

6. A compound of claim 3 wherein $m$ is 1 and $R^4$ is $CH_3$.

7. A compound of claim 1 wherein $R^1$ is alkyl of two to 21 carbon atoms.

8. A compound of claim 7 wherein $R^1$ is alkyl of eight to 18 carbon atoms.

9. A compound of claim 7 wherein $R^3$ is H, $m$ is 1 and $R^4$ is H.

10. A compound of claim 9 wherein $R^1$ is alkyl of eight to 18 carbon atoms.

11. A compound of claim 1 wherein $R^1$ is a group of the formula $-(CH_2)_n-COOR^2$.

12. A compound of claim 11 wherein $n$ is 1.

13. A compound of claim 12 wherein A is $-CH_2CH_2-$.

14. A compound of claim 11 wherein $R^2$ is alkyl of seven to 18 carbon atoms.

15. A compound of claim 14 wherein A is $-CH_2CH_2-$.

16. The compound of claim 5, 3,9-Bis-(2-n-dodecylthioethyl)-2,4,8,10-tetraoxaspiro(5,5)undecane.

17. The compound of claim 5, 3,9-Bis-(2-isooctyloxyethyl)-2,4,8,10-tetraoxaspiro(5,5)undecane.

18. The compound of claim 13, 3,9-Bis-(2-n-dodecyloxycarbonylmethylthioethyl)-2,4,8,10-tetraoxaspiro(5,5)undecane.

19. The compound of claim 13, 3,9-Bis-(2-n-octadecyloxycarbonylmethythioethyl)-2,4,8,10-tetraoxaspiro(5,5)undecane.

20. The compound of claim 13, 3,9-Bis-(2-isooctyloxycarbonylmethylthioethyl)-2,4,8,10-tetraoxaspiro(5,5)undecane.